May 17, 1966  F. H. MIDDLETON ET AL  3,251,999
PHOTOELECTRIC SYSTEM FOR MEASURING THE DENSITY OF SMOKE
Filed Nov. 26, 1962  2 Sheets-Sheet 2
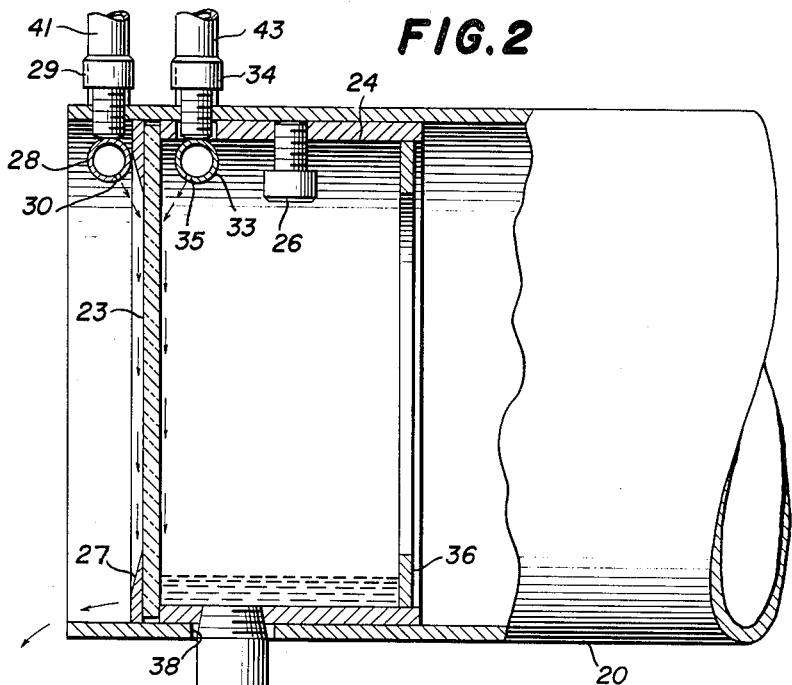
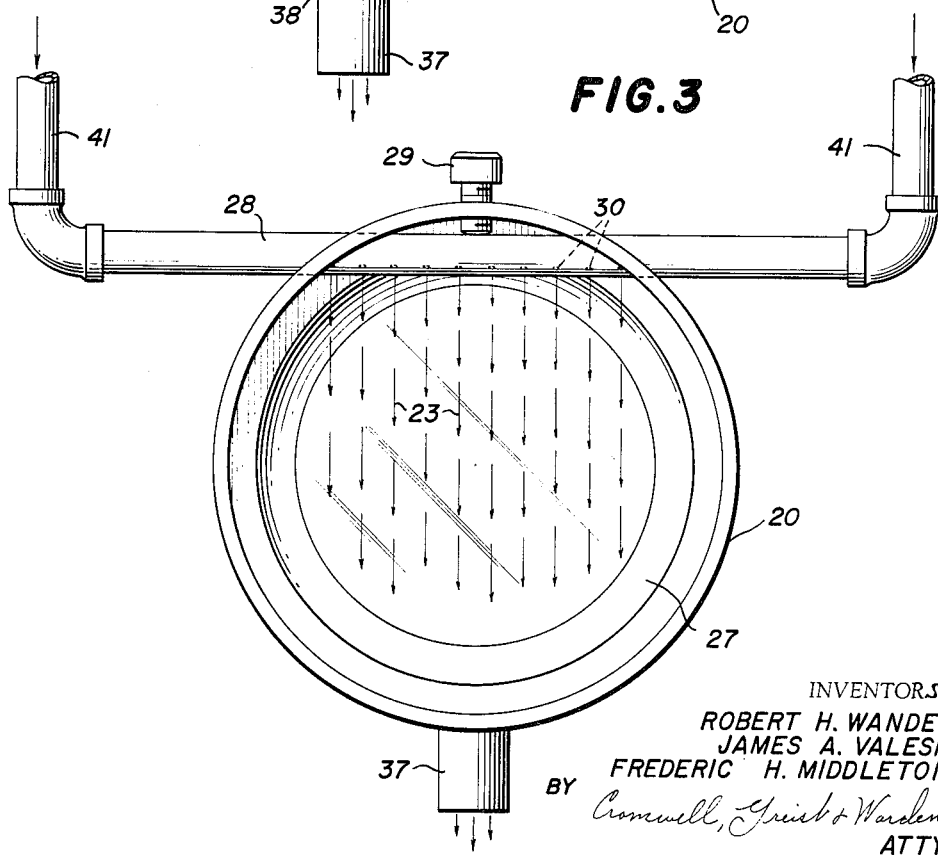
INVENTORS
ROBERT H. WANDEL
JAMES A. VALESH
FREDERIC H. MIDDLETON
BY Cromwell, Greist & Warden
ATTYS.

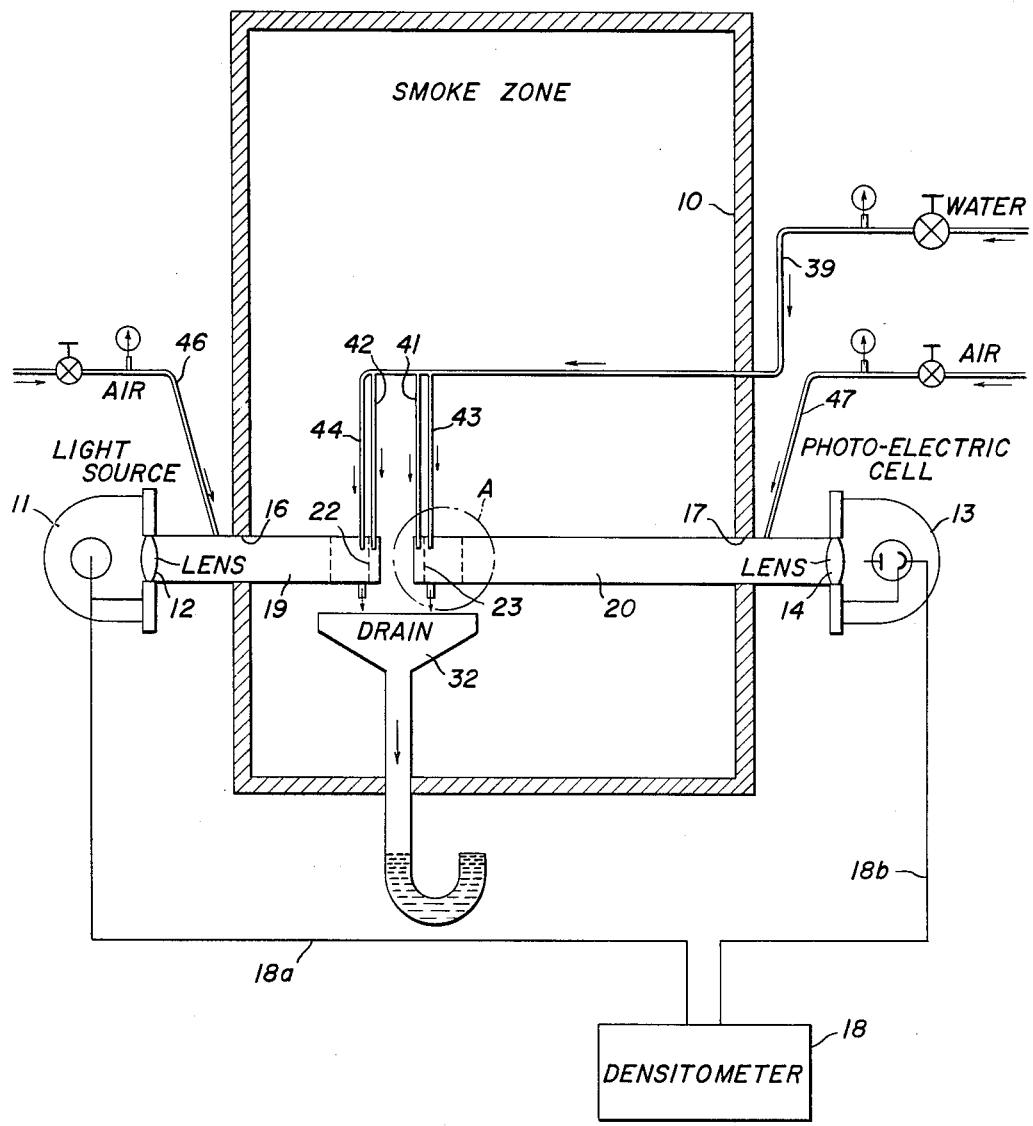

United States Patent Office 3,251,999
Patented May 17, 1966

3,251,999
PHOTOELECTRIC SYSTEM FOR MEASURING
THE DENSITY OF SMOKE
Frederic H. Middleton, Robert H. Wandel, and James A. Valesh, Madison, Wis., assignors to Oscar Mayer & Company, Inc., Chicago, Ill., a corporation of Illinois
Filed Nov. 26, 1962, Ser. No. 239,895
1 Claim. (Cl. 250—218)

This invention relates to measuring the density of a colloidal dispersion of a liquid and/or solid in a gas (especially smoke), and more particularly to improvements in a photoelectric system used for making such a density measurement.

The density of a colloidal dispersion of a liquid and/or solid in a gas, such as smoke, may be conveniently measured by a photoelectric system. Such a system includes a light source and a photoelectric cell, both appropriately mounted in or near a chamber containing the gaseous colloidal dispersion or a sample thereof, the density of which is to be measured, i.e., the light source and photoelectric cell are optically aligned to permit light from the light source to pass through the dispersion in the chamber and fall on the photoelectric cell. The light source and photoelectric cell are suitably connected in an electrical circuit with a measuring device, such as a densitometer. The density of a colloidal dispersion in the gas is positively correlated to the ability of the colloidal dispersion to obscure light falling on the photoelectric cell. The reduction in the intensity of light falling on the photoelectric cell is detected by the cell and this results in an indication in the measuring device where the density of the gas may be read directly. Heretofore, it has been found difficult, if not impossible, to obtain continuous accurate density measurements in a system of the type described because of the tendency of the dispersion to form deposits on the lenses or glass envelopes of the light source and the photoelectric cell. Obviously, the formation of deposits on these lenses has a direct effect on their optical properties, thereby resulting in a change in the amount of light being received by the photoelectric cell which causes an erroneous density measurement.

The instant invention has particular utility in the making of smoked meat and sausage products, such as weiners, where it is necessary to pass these meat products as they are being made through a smoke house, or a smoke tunnel such as shown in U.S. Patent No. 3,059,272 to Millenaar. Modern equipment provides for the continuous making of these metal products. This equipment may include a long tunnel which is compartmentized; a compartment of this tunnel is constantly filled with smoke the density of which must be accurately controlled at all times to provide uniform qualities in the meat product being smoked. A photoelectric system of the type described has been employed for measuring the density of the smoke within the smoke filled compartment of such a wiener tunnel. However, it has been found to be extremely difficult to obtain accurate readings because of the formation of smoke residue deposits on the lenses associated with the light source and photoelectric cell making up the photoelectric system for measuring the smoke density. The instant invention provides, inter alia, means for preventing these smoke deposits on these lenses. However, it will be realized that the invention has utility in any similar optical system using the obscuration principle for measuring the density of a colloidal dispersion of a liquid and/or solid in a gas.

Accordingly, it is a primary object of this invention to provide in a photoelectric system for measuring the density of a colloidal dispersion in a gas, means for preventing the formation of deposits on the lenses of the light source and the photoelectric cell.

It is a more specific object of this invention to provide in a photoelectric system of the type described a pair of sight glasses associated with the lenses of said light source and said photoelectric cell, respectively, and means for forming a thin liquid film of cleansing liquid on the faces of the sight glasses exposed to the gaseous atmosphere.

Still another object of this invention is to provide in a photoelectric system of the type described a pair of sight glasses associated with the lenses of the light source and the photoelectric cell, respectively, and means for forming a thin liquid film on each side of each of the sight glasses.

It is still further object of the present invention to provide in a photoelectric system of the type described means for defining a measuring space in the chamber containing a gas the density of which is to be measured, thereby providing a more accurate density determination.

These and other objects and advantages of the invention will become more apparent from the following specification wherein like numerals refer to similar parts throughout.

In the drawings:

FIG. 1 is a schematic view of a photoelectric system for measuring the density of a colloidal dispersion in a gas in a chamber;

FIG. 2 is a greatly enlarged partial section and partial side view of the portion of the system of FIG. 1 within the broken line circle indicated A; and FIG. 3 is a left end view of the portion of the apparatus shown in FIG. 2.

FIG. 1 schematically shows a chamber 10, which chamber is adapted to contain a gas, such as smoke, the density of which is to be measured by a photoelectric system. For example, the chamber 10 may be the smoking zone or compartment of the tunnel in U.S. Patent No. 3,059,272 to Millenaar. The photoelectric system includes a light source 11 having a lens 12 and a photoelectric cell 13 having a lens 14. The light source and photoelectric cell may be mounted by an suitable means within the chamber 10 or without the chamber and in alignment with openings 16 and 17, respectively, provided in the walls of the chamber. A density measuring device 18 of known type, such as a Brookes densitometer, is electrically connected in known circuit relationship with the photoelectric cell and the light source by means of conductors 18a and 18b permitting the density of smoke within the chamber to be read directly. The densitometer may be of the indicating and/or recording type. Of course, other suitable measuring devices may be used.

It will be understood that the light source 11 and the photoelectric cell 13 are appropriately mounted in alignment with each other whereby a beam of light emanating from the light source will pass through the gaseous atmosphere in the chamber and fall onto the photoelectric cell where its intensity will be detected. It is not necessary for the beam of light to pass in a straight line from the lens to the photoelectric cell. One or more prisms, for example, could be mounted in the gaseous atmosphere thereby permitting the light source and the photoelectric cell to be mounted in a variety of positions in or near the chamber 10. Smoke, or other colloidal gaseous dispersions, in the chamber obscures the passage of this light, and the ability of the dispersion to obscure the light is positively correlated to the density of the colloidal dispersion. Variation in the amount of light received by the photoelectric cell resulting from partial obscuration by the smoke is transmitted to the densitometer 18 where the density of the colloidal dispersion may be read. The novel means for preventing the formation of smoke deposits on the lenses 12 and 14, which deposits result in erroneous density readings in the densitometer, will now be described.

A pair of colinear tubular members 19 and 20 are mounted in the chamber 10 within respective apertures 16 and 17 provided in the walls of the chamber. The inner ends of the tubular members are closely spaced apart as shown and the outer ends of the tubular members 19 and 20 extend to and engage the faces of the light source 11 and photoelectric cell 13, respectively. It will be realized that the tubular members 19 and 20 are each co-axial with a straight line defined by a beam of light extending from the light source to the photoelectric cell. The inner ends of the tubular members 19 and 20 are sealed by a pair of transversely disposed sight glasses or transparent plates 22 and 23, respectively. The outer ends of the tubular members 19 and 20 are in sealing engagement with the faces of the light source and photoelectric cell, respectively, around the lenses in the light source and photoelectric cell. In effect then, the lens 12 of the light source is sealed off from the gaseous atmosphere in the chamber 10 by means of the tubular member 19 and sight glass 22, and the lens 14 of the photoelectric cell 13 is similarly sealed off from the gaseous atmosphere by means of the tubular member 20 and sight glass 23.

The inner or confronting faces of the sight glasses 22 and 23 are exposed to the gaseous atmosphere within the chamber 10. Smoke particles or other deposits are prevented from forming on the confronting faces of the sight glasses by continuously forming a thin liquid film over these faces, or these deposits are removed or rinsed from the confronting faces by intermittently forming the thin film of these faces. Also, preferably means is provided for continuously or intermittently forming a thin liquid film on the faces of the sight glasses 22 and 23 within the tubular members for preventing the formation of condensation or deposits on these faces of the sight glasses.

The means for forming these thin liquid films on both faces of each of the sight glasses will be best understood with reference to FIGS. 2 and 3 which show the inner end portion of the tubular member 20 within the broken line circle A of FIG. 1. It will be realized that the means for forming a film on both sides of the sight glass 23 are identical to the means for forming a thin film on each face of the sight glass 22 in the tubular member 19.

A sleeve 24 having an outside diameter adapting the sleeve to fit snugly within the tubular member 20 is mounted therein a short distance from the inner end thereof for forming an annular seat for the sight glass 23, which is illustrated as a circular transparent plate made of glass, plastic, etc. The sleeve 24 is provided with a set screw 26 threadingly engageable in the wall thereof, which set screw is adapted to frictionally engage the inside surface of the tubular member 20 for securing the sleeve 24 in place. A retaining ring 27 having a tapered inner edge is secured within the tubular member 20 in flush contact with the face of the sight glass 23 which is exposed to the gaseous atmosphere, thereby securely mounting the sight glass in the tubular member.

A generally horizontally disposed conduit 28 is mounted in the innermost portion of the tubular member 20 for forming a thin liquid film on the face of the sight glass 23 exposed to the gaseous atmosphere in the chamber 10. The conduit 28 is mounted in a pair of co-axial apertures formed in the wall of the tubular member 20 for supporting the conduit 28 near the exposed face of the plate 23 at the upper portion thereof. A set screw 29 threadingly engageable in an aperture in the wall of the tubular member at the uppermost portion thereof frictionally engages the conduit 28 for securing the same in place. The conduit 28 is provided in the wall thereof with a plurality of aligned apertures 30 spaced apart therealong in a straight line. As seen in FIG. 3 the apertures 30 are spaced along an intermediate position of the conduit for forming a film over substantially all of the face of the sight glass within the retaining ring 27. The conduit 28 is rotated within its receiving apertures in the walls of the tubular member 20 so that the axes of the apertures 30 will be inclined downwardly at an angle of approximately 30° from the vertical for directing a liquid, such as water, onto the exposed face of the plate 23 in a plurality of streams, which streams are flattened upon impact and converge into one complete film of water. Liquid from the conduit 28 flows downwardly in a thin film over the exposed face of the sight glass 23 where it will flow out of the tubular member 20 and into a drain 32 (see FIG. 1).

A second conduit 33 is mounted in the tubular member 20 in a manner similar to the mounting of the conduit 28 for forming a thin film on the other face of the sight glass 23, i.e., the face enclosed within the tubular member 20 which extends to the photoelectric cell and is in sealing engagement with the face thereof around the lens 14. A set screw 34 threadingly engaged in an aperture in the wall of the tubular member 20 at the top thereof is adapted to secure the conduit 33 in place in the tubular member 20. The conduit 33 is provided with a plurality of apertures 35 spaced along the conduit in a straight line in the portion of the conduit disposed within the inside of the tubular member 20. The conduit 33 is rotated within its receiving apertures in the walls of the tubular member 20 until the apertures 35 in the conduit are inclined downwardly and inwardly from the vertical for directing a plurality of streams of a liquid, such as water, from the conduit onto the face of the sight glass 23 which is enclosed within the tubular member. The streams flatten or merge upon impact and converge into one complete film of water substantially covering the face of the sight glass 23. Water draining from the face of the sight glass 23 which is enclosed within the tubular member 20 is collected within the sleeve 24 by the provision of a ring 36 which is secured in the end of the sleeve 24 remote from the end thereof in contact with the sight glass 23. Water collected in the lower portion of the sleeve 24 between the sight glass and the ring 36 flows out of the tubular member through a drain pipe 37, which drain pipe is threadingly engaged in an aperture in the lowermost portion of the sleeve 24. An opening 38 provided in the wall of the tubular member 20 at the lowermost portion thereof is adapted to receive the drain pipe 37. Water flowing from the pipe 37 is collected in the drain 32, and water from the drain 32 may be recirculated for distribution over the sight glasses if desired.

All of the conduits 28 are in communication with a suitable source of liquid, such as water, preferably at 1.5 pounds per square inch, for continuously or intermittently forming thin films on each side of each sight glass. As seen in FIG. 1, a pipe 39 in communication with a source of liquid extends into the chamber 10 and communicates with a plurality of pairs of pipes 41, 42, 43 and 44. The inner pair of conduits 28 are supplied with a liquid by the pipes 41 and 42, respectively, and the outer pair of conduits 28 are supplied with a liquid by the pipes 43 and 44, respectively. It will be realized that means other than apertured conduits could be provided for forming the thin liquid films on the sight glasses. For example, a trough could be positioned at the upper portion of the sight glass for spilling liquid over into a film on the face of the sight glass.

Preferably, both tubular members 19 and 20 are supplied with air pressure at approximately 10 to 15 pounds per square inch gauge. Each tubular member forms a sealed enclosure as the ends thereof are sealed with a sight glass and a lens, respectively, and there is some tendency for condensation to form on the faces of the sight glasses and lenses enclosed within the tubular members. The introduction of air under pressure into the tubular members aids in preventing the formation of condensation on these faces and generally improves the clearness of the atmosphere within the tubular members. In FIG. 1 an air tube 46 is shown in communication with the tubular member 19, and an air tube 47 is shown in communication with the tubular member 20, for pressurizing these members.

The novel construction described above prevents deposits from forming on the exposed faces of the sight glasses. The construction described also prevents condensation on other deposits from forming on the lenses and the other faces of the sight glasses. Accordingly, continuous accurate density measurements may be made within the chamber 10, which chamber may be constantly filled with smoke as in a compartment of a wiener tunnel.

There is also another significant advantage to the construction described above. This resides in the provision of mounting the sight glasses 22 and 23 in a rather close together relationship in the inner ends of the co-linear tubular members 19 and 20, respectively, for defining a measuring space in the chamber 10 between the sight glasses. Obviously, if it is necessary for light emanating from the light source to pass through the gas in the chamber during its entire path across the chamber total light blockage might occur when the smoke is very dense unless a light source of extraordinary intensity is used. In the construction shown light emanating from the light source only passes through the gas in the chamber as it passes from one sight glass to the other. This construction permits a conventional light source and photoelectric cell to be employed without total light blockage occurring even when the smoke in the chamber is relatively dense. The measuring space between the sight glasses may be easily varied for calibrating of the photoelectric system by altering the length of the tubular members or by adjusting their amount of extension into the chamber 10. For purposes of illustration only a sight glass spacing of 1½ inches permits smoke densities from 0 to 4.5 Ringelman units to be measured with conventional equipment.

Thus it can be seen that by this invention novel means have been provided for preventing smoke or other deposits from forming on the lenses associated with the light source and photoelectric cell in a photoelectric system used for measuring the density of a gas. The lenses of the photoelectric system which would normally have one of their faces exposed to the gaseous atmosphere in the chamber are enclosed by the tubular members and sight glasses. Deposits or condensation are prevented from forming on both faces of each of the sight glasses by continuously forming on each of these faces a thin liquid film. This film constantly washes or rinses the faces of the sight glasses thereby insulating these faces from the surrounding atmospheres. It may be desirable to wash or rinse the sight glasses intermittently. For example, if density measurements are to be made rather frequently, the sight glasses may be rinsed only when such measurements are being made. In this case the deposits or condensation are washed or rinsed from the faces of the sight glasses. Of course, whether continuous or intermittent films are formed on the sight glasses will depend upon, inter alia, the nature of the gas, the density of the colloidal dispersion, the length of time the sight glasses are exposed to the gaseous atmosphere, etc. The liquid films formed, whether continuous or intermittent, have a minimum optical density and cause a negligible light beam distortion.

While the invention has been shown in but one form it will be obvious to those skilled in the art that it is not to be so limited, but that it is susceptible of various changes and modifications without departing from the spirit and scope of the appended claim.

We claim:

In an optical measuring system for measuring the density of a colloidal dispersion of a liquid of solid in a gas in a chamber, which system includes a sight glass having one face thereof exposed to said gas, means for forming a liquid film on said face of the sight glass comprising a generally horizontally disposed conduit supported adjacent the margin of the face of the sight glass and being generally parallel and in close proximity with a plane containing the sight glass, said conduit having discharge aperture means arranged along the length thereof for directing a liquid into a substantially uniform film on said face of the sight glass, and said conduit being adapted to communicate with a continuous source of said liquid.

References Cited by the Examiner

UNITED STATES PATENTS

| | | | |
|---|---|---|---|
| 1,937,721 | 12/1933 | Simon et al. | 88—14 |
| 1,937,722 | 12/1933 | Simon et al. | 88—14 |
| 2,361,235 | 10/1944 | Pick | 250—218 |
| 3,141,094 | 7/1964 | Strickler | 250—218 |
| 3,168,218 | 2/1965 | Funk et al. | 250—218 X |

RALPH G. NILSON, *Primary Examiner.*

JESSE D. WALL, *Assistant Examiner.*